United States Patent
Edirisooriya et al.

(10) Patent No.: US 7,213,094 B2
(45) Date of Patent: May 1, 2007

(54) METHOD AND APPARATUS FOR MANAGING BUFFERS IN PCI BRIDGES

(75) Inventors: Geetani R. Edirisooriya, Tempe, AZ (US); Aniruddha P. Joshi, Chandler, AZ (US); John P. Lee, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 10/780,372

(22) Filed: Feb. 17, 2004

(65) Prior Publication Data

US 2005/0182886 A1    Aug. 18, 2005

(51) Int. Cl.
    *G06F 13/36*    (2006.01)
(52) U.S. Cl. ........................................ 710/310; 710/57
(58) Field of Classification Search ................ 710/306, 710/310, 52, 57
    See application file for complete search history.

(56) References Cited

U.S. PATENT DOCUMENTS

| | | | |
|---|---|---|---|
| 5,241,630 A * | 8/1993 | Lattin, Jr. et al. ........... 710/310 |
| 5,941,964 A * | 8/1999 | Young et al. ................ 710/100 |
| 6,021,483 A | 2/2000 | Adar et al. | |
| 6,167,477 A * | 12/2000 | Garnett et al. ............... 710/306 |
| 6,230,228 B1 * | 5/2001 | Eskandari et al. .......... 710/310 |
| 6,240,473 B1 * | 5/2001 | Houg ......................... 710/100 |
| 6,260,096 B1 * | 7/2001 | Eskandari et al. .......... 710/310 |
| 6,298,407 B1 * | 10/2001 | Davis et al. ................. 710/314 |
| 6,421,745 B1 * | 7/2002 | James et al. .................... 710/34 |
| 6,473,826 B1 | 10/2002 | Allingham | |
| 6,549,964 B1 | 4/2003 | Lai et al. | |
| 6,625,683 B1 | 9/2003 | Khan et al. | |
| 6,708,240 B1 * | 3/2004 | Willke et al. ............... 710/240 |
| 6,728,821 B1 * | 4/2004 | James et al. ................. 710/306 |
| 6,801,970 B2 * | 10/2004 | Riley et al. .................. 710/105 |
| 6,877,044 B2 * | 4/2005 | Lo et al. .......................... 710/2 |
| 2003/0088740 A1 * | 5/2003 | Henry et al. ................. 711/137 |

FOREIGN PATENT DOCUMENTS

WO  PCT/US2005/002045    4/2005

* cited by examiner

*Primary Examiner*—Khanh Dang
(74) *Attorney, Agent, or Firm*—Blakely, Sokoloff, Taylor & Zafman LLP

(57) ABSTRACT

Method and apparatus for supporting multi-function PCI devices in PCI bridges. Respective pre-fetch buffers are allocated in response to respective initial data transfer requests issued by a multi-function PCI device. A programmable buffer fill watermark is set up for each pre-fetch buffer. While a portion of data corresponding to the data transfer requests fill the pre-fetch buffers, the fill level of each buffer is monitored to determine if it meets or exceeds its buffer fill watermark. In response to such a condition, the multi-function PCI device is connected to the PCI bridge and a virtual buffer is mapped to the pre-fetch buffer. The pre-fetch buffer is then emptied. During subsequent data transfers, each of the pre-fetch buffer becomes filled, the PCI device is connected, and the virtual buffer is mapped to the filled buffer. The process is continued until all data corresponding to the original data transfer request is received by the multi-function PCI device.

26 Claims, 8 Drawing Sheets

US 7,213,094 B2

METHOD AND APPARATUS FOR MANAGING BUFFERS IN PCI BRIDGES

FIELD OF THE INVENTION

The field of invention relates generally to computer systems and, more specifically but not exclusively relates to methods and apparatus for supporting multi-function PCI (Peripheral Component Interconnect) devices in PCI bridges.

BACKGROUND INFORMATION

Since the introduction of the personal computer (PC) architecture in 1981 and the ubiquitous PC-AT (advanced technology) architecture in 1984, PC-based computer systems have been continuously evolving. A concurrent evolution has likewise occurred with processors and operating systems. Although dramatic advancements have been made in each of these areas, the evolution process has been somewhat restricted due to legacy provisions. The legacy provisions result, in part, from the widespread popularity of PC's, which represent the vast majority of computers used worldwide. It is estimated that upwards of 100 million PC's are sold per year.

To better understand the reason for legacy provisions, consider that the PC-AT architecture is an open architecture, allowing literally 10's of thousands of peripheral components and software applications to be used on a PC-AT-based platform. Now consider the aspect of add-on peripherals. The PC-AT architecture introduced the industry standard architecture (ISA) bus and corresponding ISA expansion slots. Expansion slot architecture has evolved to include such variants as EISA (Enhanced ISA), microchannel (MC), ISA plug-n-play, and PCI (Peripheral Component Interconnect), the current de-facto standard.

The original PCI architecture was designed to solve several problems. The explicit purpose of the PCI design was to provide a standardized architecture that would simplify chipset and motherboard designs. It also was designed to improve data transfer rates. Furthermore, it provided an abstraction mechanism that enabled transparent support of legacy components. In fact, PCI is more of an interconnect (hence the name) standard than an expansion bus standard.

A key tenant of the PCI design is processor independence; that is, its circuits and signals are not tied to the requirements of a specific microprocessor or family. The design provides interconnects between various disparate bus types using bridges. A bridge may also be used to couple a pair of PCI buses. For the user, bridges are generally an invisible interface between two bus systems. The PCI architecture also decouples processor memory subsystems from subordinate buses, enabling a processor and a bridge to operate in parallel.

In order to increase efficiency of the PCI bus(es), bridges usually employee buffering to facilitate long data transfers (data streams). To support this capability, the architecture provides intelligent read and write buffers in a PCI bridge. The read buffers are commonly referred to as pre-fetch buffers, which are also known as delayed transaction buffers.

Although this burst access capability can be used to greatly increase transfer rates, the original design was targeted at transfer of single-channel data streams. As a result, recently introduced multi-function PCI devices that support multiple-channel data streams are restricted in their transfer rates. In fact, in many instances the aggregate transfer rate of all channels for a multi-function PCI device is actually less than the single channel rate for the same device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and apparatus for supporting multi-function PCI devices in PCI bridges are described herein. In the following description, numerous specific details are set forth, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
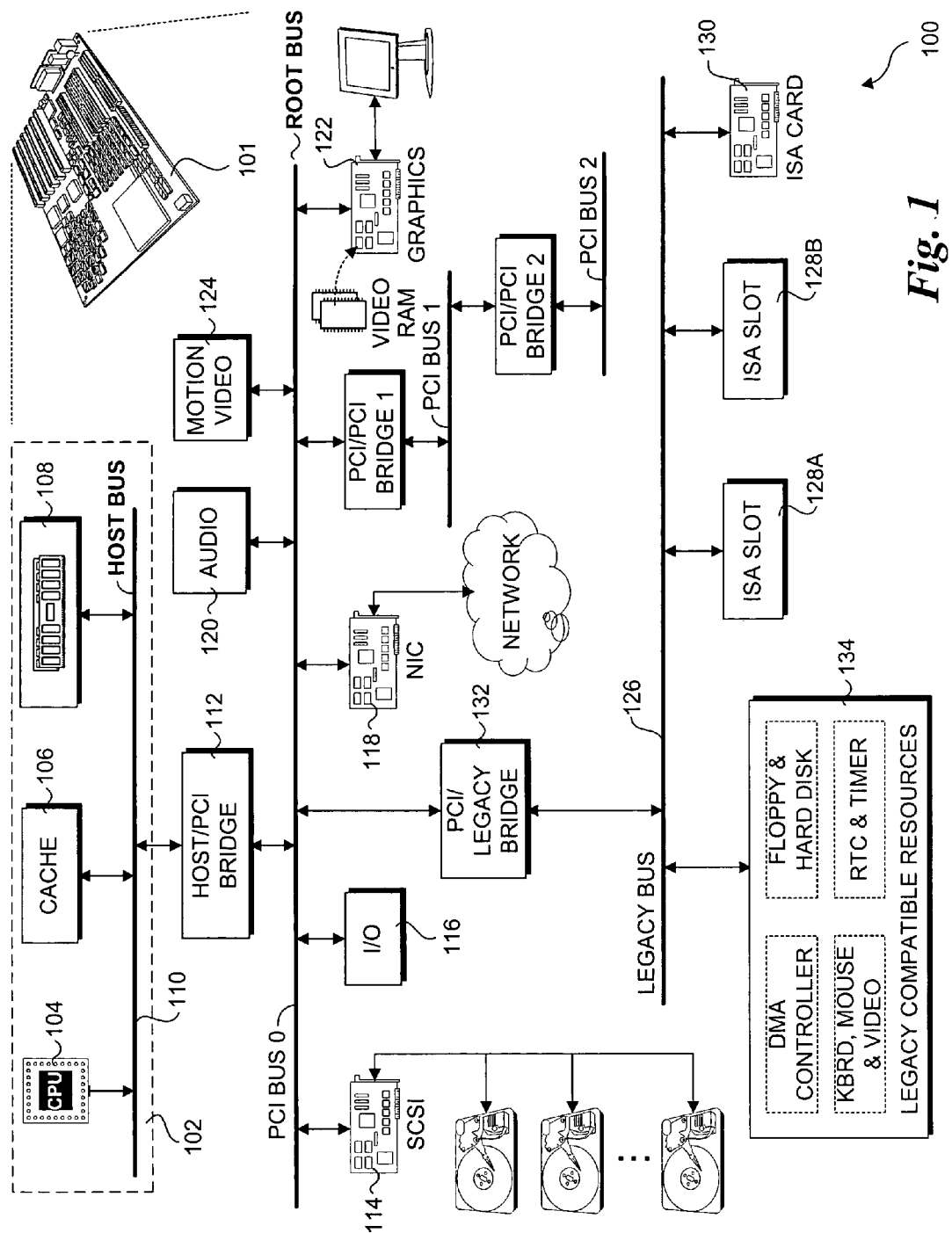
FIG. 1 is a schematic diagram of a computing platform having an exemplary bus configuration including a plurality of PCI bridges.

As an overview, attention is directed to FIG. 1, which shows an exemplary configuration of a PCI-based platform architecture 100. In general, platform architecture 100 is illustrative of PCI configurations that may be employed on various types of computing platforms, such a motherboard 101 or the like. At the top of the architecture is a processor/system memory sub-system 102. This includes the primary processing and memory components of a platform, including one or more processors 104, an external cache 106 and system memory 108 (e.g., system RAM (random access memory)). Each of these components is coupled to a host bus 110. For example, the host bus represents the address and data lines between a processor 104, external cache 106, and system memory 108 on a particular motherboard or the like.

The PCI design supports a hierarchical architecture that couples various similar and disparate buses via bridges. At the top of the hierarchy is host bus 110. The next level of architecture 100 is a PCI bus 0. Under the PCI design, PCI buses and PCI agents connected to the buses are enumerated during the pre-boot phase of a computer system's initialization. The first PCI bus that is encountered is enumerated as PCI bus 0. This PCI bus is also known as the root PCI bus. The local bus to the host CPU (in this case host bus 110), or to a PCI bridge located nearer to the host CPU, is known as the primary bus (Northbridge). The root PCI bus is known as the secondary bus. The host bus and PCI root bus are interconnected via a host-to-PCI bridge 112.

Generally, zero or more components may be connected to each bus on a given platform. For a PCI bus, these components are called PCI agents (also known as PCI unis). For example, the PCI agents of architecture 100 include a SCSI (Small Computer System Interface) host adapter 114, and input/output (I/O) unit 116, a network interface card (NIC) 118, an audio unit 120, a graphics card 122, and a motion video unit 124.

In addition to component-based PCI agents, such as those describe above, PCI agents may also comprise PCI bridges. Under the original PCI design, up to ten PCI agents could be connected to a given PCI bus. Through the use of PCI-to-PCI bridges, additional PCI buses can be supported within the same platform. For example, an exemplary pair of PCI buses 1 and 2 and corresponding PCI-to-PCI bridges 1 and 2 are shown in FIG. 1.

As discussed above, the primary endeavor of the developers of the original PCI standard was to ease design efforts for chipset and motherboard designers. One of the principle considerations for both of these design groups was support of legacy devices. For example, there needed to be a mechanism for supporting legacy buses, such as an ISA bus 126. Typically, a legacy bus will include a plurality of expansion slots, such as depicted by ISA slots 128A and 128B. These expansion slots enable peripheral add-on cards inserted into the slots, such as depicted by an ISA card 130, to be accessed by the platform.

If there were to be direct support for one or more legacy bus types via the platform chipset, there would need to be respective sets of data and address signals for each legacy bus type included in a given system. This would create chaos, as each legacy bus type requires a different set of signals having unique timing characteristics that differ from other legacy bus types. Furthermore, the bus signal routing is already complex enough for a single expansion bus.

To provide support for legacy buses, the PCI architecture enables the use of PCI-to-legacy bridges, such as depicted by a PCI-to-legacy bridge 132. In effect, a PCI-to-legacy bridge provides an abstracted logical interconnect between two disparate bus systems, wherein there is no physical connection between the buses, but rather data paths are logically connected via various control and timing measures. This enables various legacy components connection to legacy bus 126, such as legacy compatible resources 134 and peripheral cards connected to legacy expansion bus slots 128A and 128B, to co-exist in a PCI-based platform with non-legacy components.

The PCI bus and its bus cycles use a multiplexing scheme in which the lines are alternately used as address and data lines. This saves on the number of signal lines required, but increases the number of clock cycles for each data transfer. For example, during a data transfer the address is transferred during a first cycle, write data during the second, and read data during the third. To compensate for this, the PCI bus also includes a burst mode in which the address is only transferred once, followed by a variable-length sequence of data transfers with each clock cycle. This effectively doubles the data transfer rate of the non-burst scheme.

Figure 2:
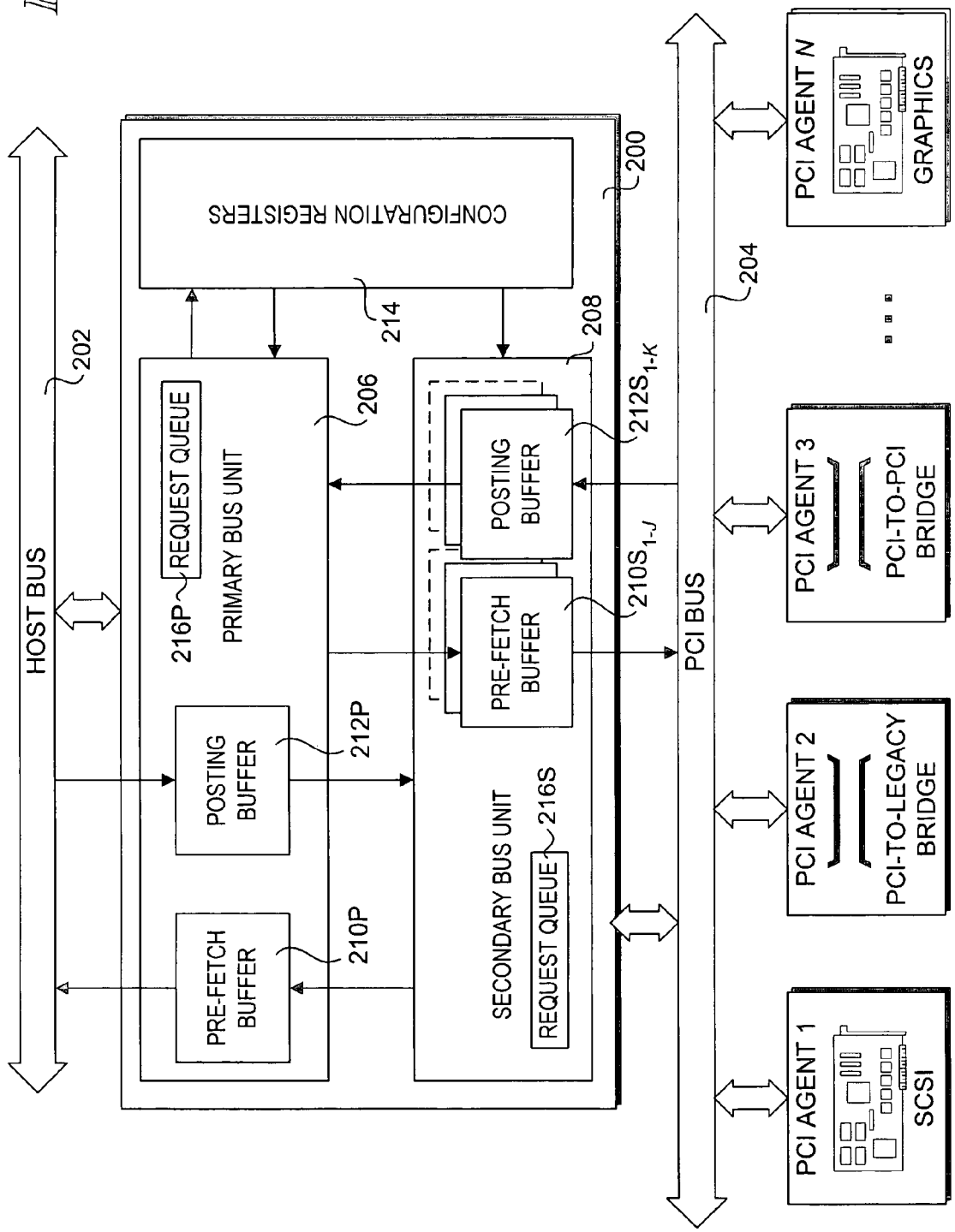
FIG. 2 is a schematic diagram of a typical host-to-PCI bridge.

The data burst scheme is enabled by configurable hardware provided by a PCI bridge. For example, FIG. 2 illustrates a typical layout of a PCI bridge 200, which in this instance comprises a host-to-PCI bridge. The PCI bridge is coupled between a host bus 202 and a PCI bus 204. In general, PCI bridge 200 is illustrative of various types of PCI bridges, including host-to-PCI bridges, PCI-to-PCI bridges, and PCI-to-legacy bridges. As such, the top-level (upstream) bus will correspond to the primary bus, while the lower-level (downstream) bus will correspond to the secondary bus. In general, the primary bus and secondary bus may be of disparate bus types (e.g., host-to-PCI, PCI-to-legacy) or the same bus type (PCI-to-PCI).

Accordingly, PCI bridge 200 includes a primary bus unit 206 and a secondary bus unit 208. Each of these bus units includes physical interfaces to couple with their corresponding buses. For example, in the exemplary configuration shown in FIG. 2, secondary bus unit 208 would be configured to interface with a PCI bus having a configuration defined by the PCI bus specification, while primary bus unit 206 would be configured to interface with the host bus defined by the platform's processor architecture (generally).

To support data bursts, as well as asynchronous data transfers, each of the primary and secondary bus units 206 and 208 include pre-fetch buffers (also known as delayed transaction buffers) and posting buffers. Generally, the primary bus unit will include a single pre-fetch buffer 210P and a single posting buffer 212P, although there may be more than one of each of these buffers. The secondary bus unit will typically have 1-J pre-fetch buffers and 1-K posting buffers, as depicted by pre-fetch buffers $210S_{1-J}$ and posting buffers $212S_{1-K}$. In some implementations the numbers of pre-fetch and posting buffers will be the same, while in others the numbers will not be unequal.

In conjunction with the use of pre-fetch and posting buffers, a queuing mechanism is provided to arbitrate data requests. The operations of the queuing mechanism are represented by request queues 216P and 216S.

As discussed above, a PCI bus is generally reconfigurable. The particular configuration to be implemented is defined by values contained in configuration registers 214. Also shown in FIG. 2 is an exemplary set of PCI agents 1-N coupled to PCI bus 204. From the perspective of PCI bride 200 operations, each PCI agent, whether a peripheral component such as a SCSI or graphics card, or a PCI bridge, appear the same.

In order to support concurrent access to various PCI agents coupled to a common bus, the PCI architecture provides various data transfer mechanisms, including the data burst scheme discussed above. These schemes employ timing and transaction ordering in a manner that prevents unwanted conditions, such as lost data or deadlocks. Included among the schemes is a mechanism for supporting Delayed Transactions.

Delayed transactions are used by targets that cannot complete the initial data phase within the requirements of the PCI specification. There are generally two types of devices that will use delayed transactions: I/O controllers and bridges Typically, I/O controllers will handle only a single delayed transaction at a time, while PCI bridges may choose to handle multiple delayed transactions to improve system performance.

One advantage of a delayed transaction is that the bus is not held in wait states while completing an access to a slow device. While the originating master rearbitrates for the bus, other bus masters are allowed to use the bus bandwidth that would normally be wasted holding the originating master in wait states. Another advantage is that all posted (memory write) data is not required to be transferred before the request is accepted.

All bus commands that must complete on the destination bus before completing on the originating bus may be completed as a delayed transaction. These include Interrupt Acknowledge, I/O Read, I/O Write, Configuration Read, Configuration Write, Memory Read, Memory Read Line, and Memory Read Multiple commands. Memory Write and Invalidate commands can complete on the originating bus before completing on the destination bus (i.e., can be posted). Each command is not completed using delayed transaction termination and are either posted or terminated with a retry. For I/O controllers, the term destination bus refers to the internal bus where the resource addressed by the transaction resides. For a PCI bridge, the destination bus means the interface that was not acting as the target of the original request. For example, the secondary bus of a bridge is the destination bus when a transaction originates on the primary bus of the bridge and targets (addresses) a device attached to the secondary bus of the bridge. However, a transaction that is moving in the opposite direction would have the primary bus as the destination bus.

A delayed transaction progresses to completion via three steps: (1) Request by the master; (2) Completion of the request by the target; and (3) Completion of the transaction by the master. During the first step, the master generates a transaction on the bus, the target decodes the access, latches the information required to complete the access, and terminates the request with retry. The latched request information is referred to as a delayed request. The master of a request that is terminated with retry cannot distinguish between a target which is completing the transaction using delayed transaction termination and a target which simply cannot complete the transaction at the current time. Since the master cannot tell the difference, it must reissue any request that has been terminated with retry until the request completes.

During the second step, the target independently completes the request on the destination bus using the latched information from the Delayed Request. If the delayed request is a read, the target obtains the requested data and completion status. If the delayed request is a write, the target delivers the write data and obtains the completion status. The result of completing the delayed request on the destination bus produces a delayed completion, which consists of the latched information of the delay request and the completion status (and data if a read request). The target stores the delayed completions until the master repeats the initial request.

During the third step, the master successfully rearbitrates for the bus and reissues the original request. The target decodes the request and gives the master the completion status (and data if a read request). At this point, the delayed completion is retired and the transaction is completed. The status returned to the master is exactly the same as the target obtained when it executed (completed) the delayed request.

The conventional delayed transactions scheme provides good to excellent bandwidth usage for single function devices, such as graphics cards, single-channel disk controllers, single-port network cards, etc. However, the same is not true for many multi-function PCI devices. This is due, in part, to the original PCI specification not providing specific techniques and interfaces for supporting multi-function PCI devices.

Generally, a multi-function PCI device will be embodied as a peripheral expansion card that is configured in accordance with the PCI specification (current version 2.2.) or the PCI-X specification (current version revision 1.0). Multi-function PCI devices may also include PCI devices that are integrated on the platform. Such a device is termed multi-function because it effectively provides multiple PCI device functions on the same card or built-in component. For example, a dual-channel disk controller, such as a dual-channel SCSI host adapter (e.g., expansion card), performs in a manner similar to two separate single-channel host adapters. Other common examples of multi-function PCI devices include multi-channel USB cards, multi-port network cards, combination USB and Firewire™ (IEEE 1394) cards, etc.

Figure 3:
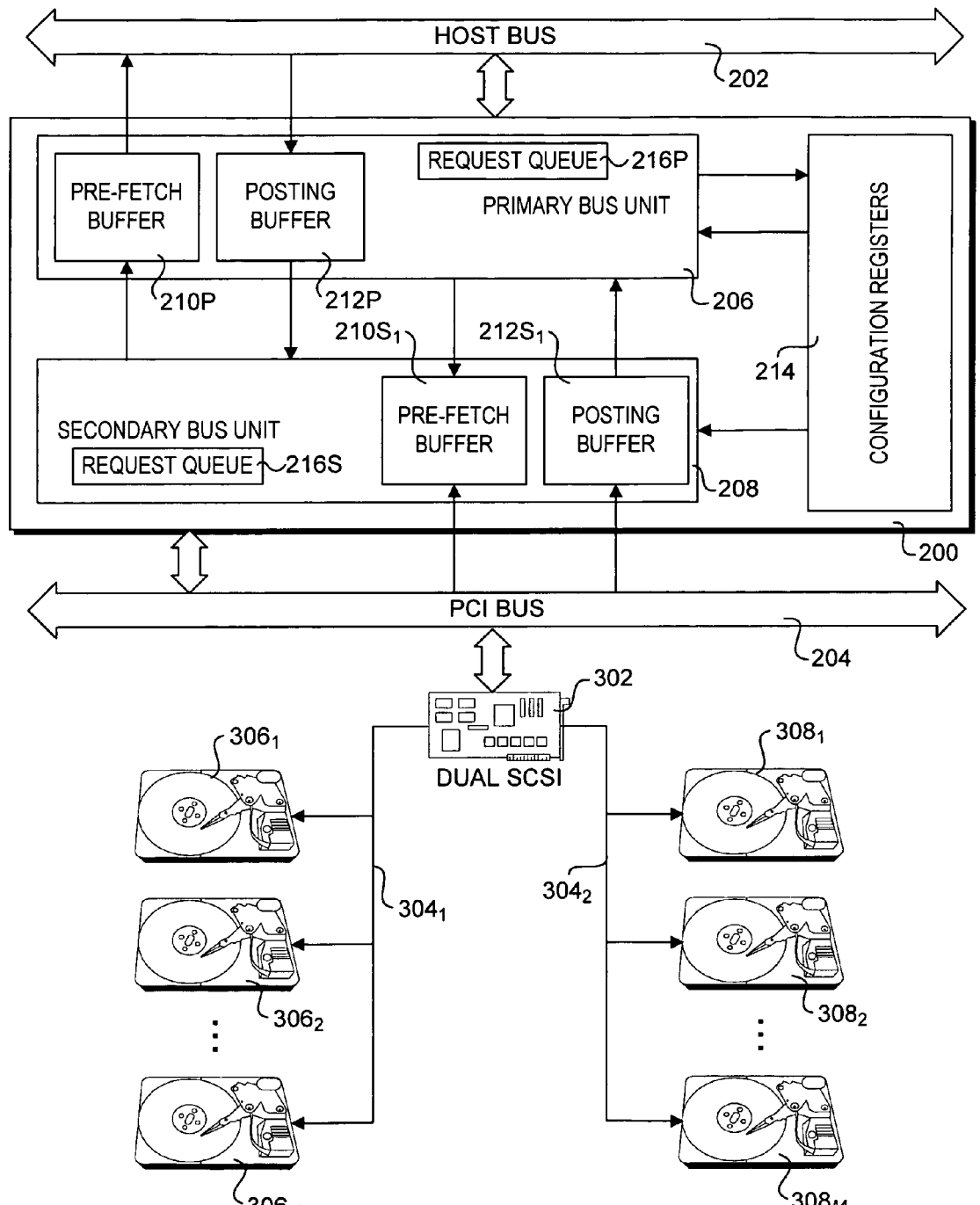
FIG. 3 is a schematic diagram of the host-to-PCI bridge of FIG. 2 further including a dual-channel PCI SCSI device connected to the PCI bus.

An exemplary PCI configuration 300 including a dual-channel PCI SCSI controller 302 is shown in FIG. 3. For clarity, other PCI agents that may be coupled to PCI bus 204 are not shown. The dual-channel PIC SCSI controller 302 provides two SCSI channels $304_1$, and $304_2$. SCSI channel $304_1$, is used to access a plurality of SCSI disk drives $306_{1-N}$, while SCSI channel $304_2$ is used to access a plurality of SCSI disk drives $308_{1-M}$.

Figure 3A:
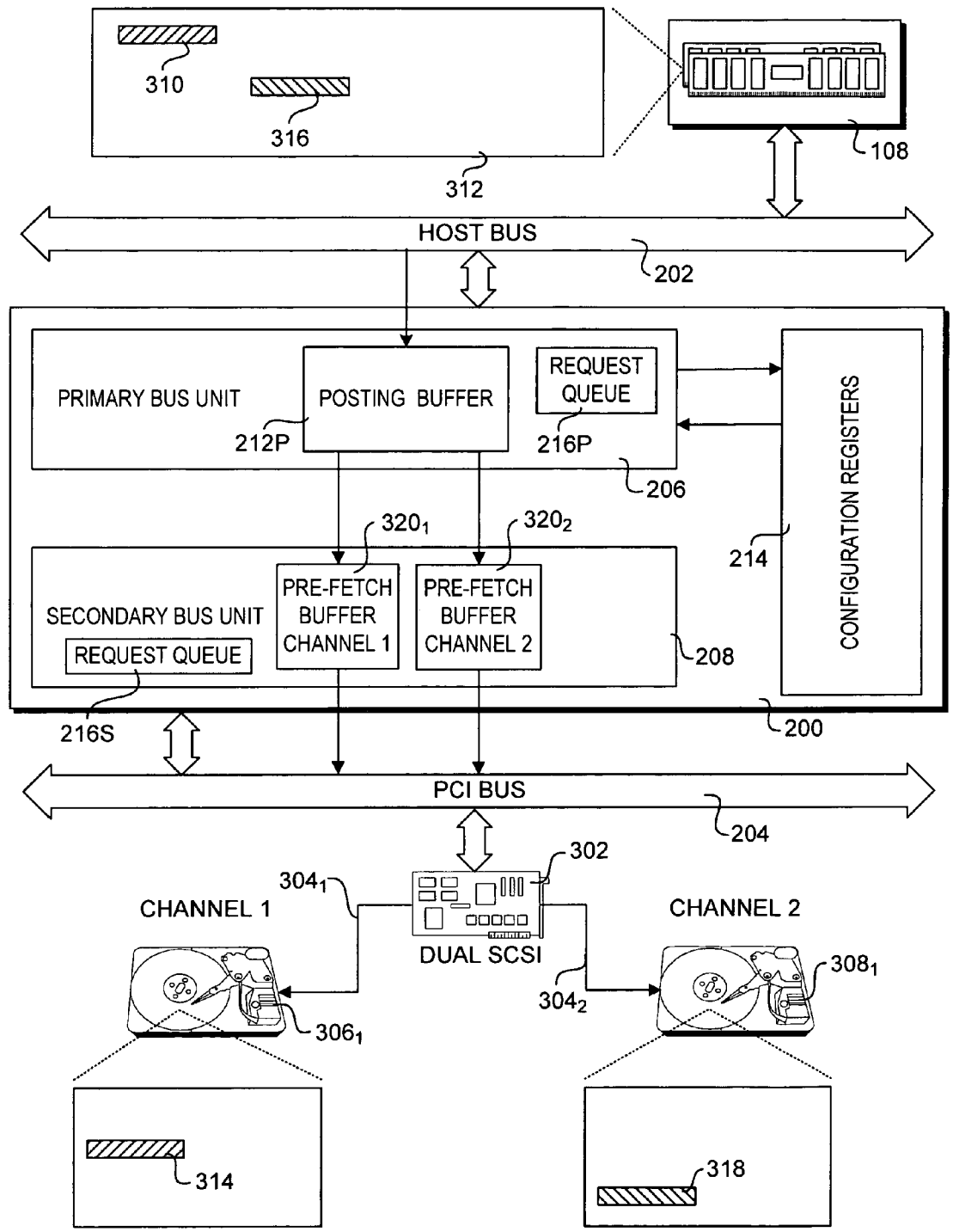
FIG. 3a is a schematic diagram illustrating components implemented to concurrently transfer data from system memory to the dual-channel PCI SCSI device.

FIG. 3*a* shows a pair of exemplary write transactions to be performed by PCI configuration 300. In particular, each operation involves transferring data (e.g., a file) from system memory 108 to a disk drive controlled by dual-channel PCI SCSI host device 302. In further detail, a first operation will involve copying data 310 occupying a system memory address space 312 to a selected logical block address range 314 for SCSI disk drive $306_1$. Meanwhile, a second operation will involve copying data 316 in system memory address space 312 to a selected logical block address range 318 for SCSI disk drive $308_2$.

Figure 4:
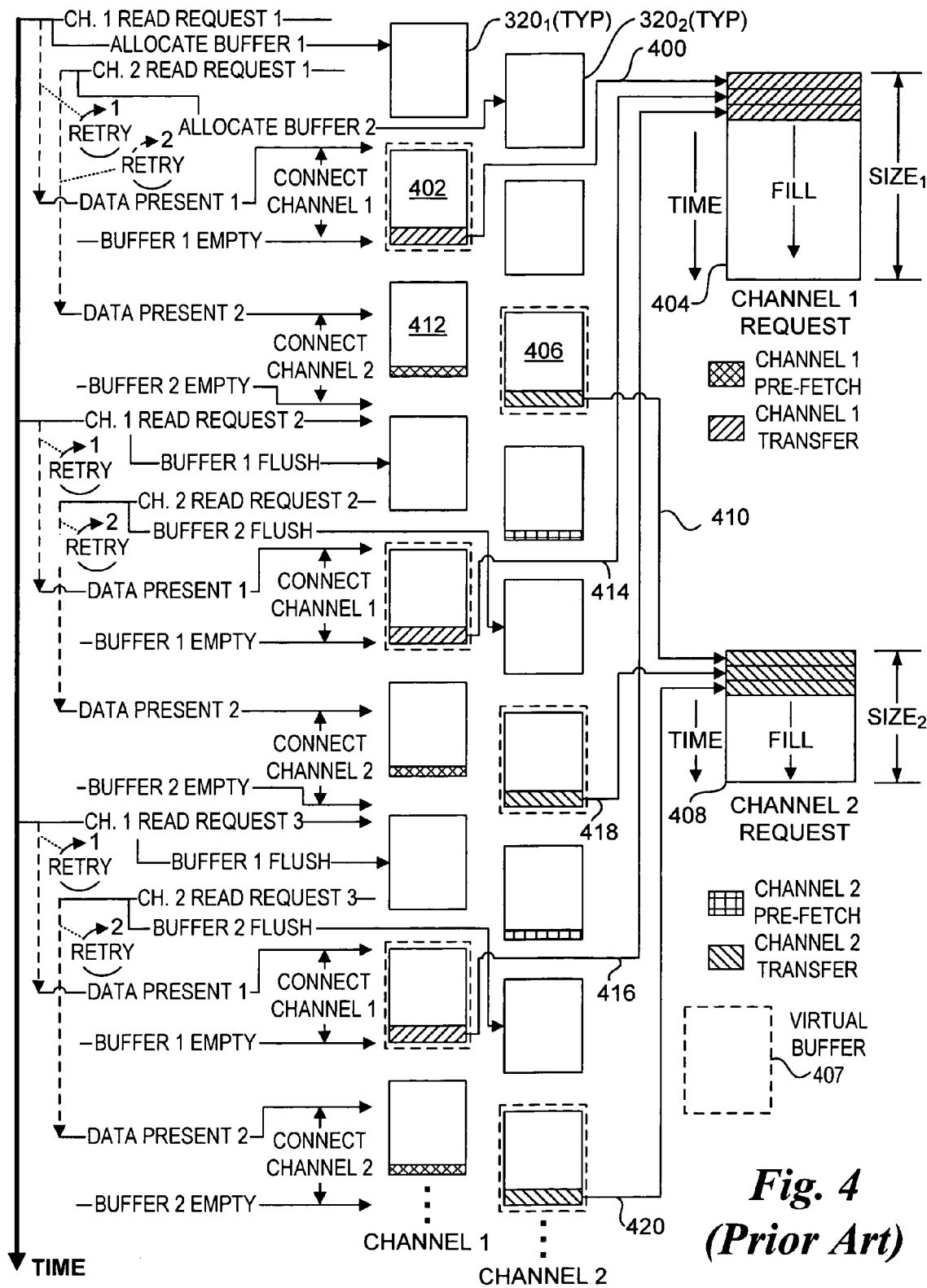
FIG. 4 is a schematic flow diagram illustrating operations to perform the data transfers of FIG. 3a using a pair of delayed transactions using a technique implemented with a conventional PCI bridge.

With reference to FIGS. 3*a* and 4, the conventional technique for performing concurrent write transactions proceeds as follows. For illustrative purposes, both of the exemplary operations shown comprise delayed read transactions generated by the SCSI controller on the PCI bus. It is noted that the time scales depicted in FIGS. 4 and 5 do not correlate to evenly spaced events. Furthermore, the event sequences for each of the first and second channel data request sequences are to be considered separately, although they are shown as a common sequence in FIGS. 4 and 5 for convenience and clarity.

During an initial portion of each operation, a data transfer request is provided to the PCI agent (i.e., dual-channel PCI SCSI controller 302) that is to service the request. In response, the PCI agent will attempt to retrieve appropriate data by generating a PCI read transaction to the PCI bridge 200. Once the request is acknowledged by the PCI bridge 200, operations are performed on the primaly side of PCI bridge 200 to deliver data to posting buffer 212P. These operations are generally asynchronous to the operations performed by the secondary side of PCI bridge 200. These operations also are competing with other ongoing transfer operations (not shown), wherein the various transfers are arbitrated by PCI bridge 200.

During the same timeframe, the PCI agent will attempt to begin retrieving the data. This retrieval process begins with a read request to secondary bus unit 208 corresponding to the retrieval of data 310. The read request will typically specify a starting address. The PCI bridge 200, can identify the requesting PCI device (dual channel PCI SCSI controller) by monitoring arbitration signals. However, in case of multifunction PCI device such as a dual channel PCI SCSI controller it is not possible for the PCI bridge 200 to identify the specific channel that initiated the request. For clarity all read request corresponding to storing data on disk drives connected to channel 1 are depicted in FIG. 4 as a channel 1 read request.

In response to the read request, PCI bridge 200 will allocate a pre-fetch buffer 320, for the delayed read transaction. For convenience, this pre-fetch buffer is labeled "PREFETCH BUFFER CHANNEL 1" in FIG. 3a. As discussed above, the PCI bridge will actually not associate the buffer with a channel in practice, but will rather associate it with a particular transfer request.

Dual-channel PCI devices are enabled to support data requests from two channels. In particular, these data requests will typically appear more as streams of requests than individual requests.

For example, FIG. 4 shows a second read request invoked in response to a second delayed read transaction that is to copy data 316 to disk drive 308$_1$. Accordingly, this read request is labeled as a channel 2 read request in FIG. 4. As with the channel 1 read request above, PCI bridge 200 allocates a pre-fetch buffer 320$_2$ corresponding to this second delayed read transaction.

In general, a PCI device will continuously retry a given read request on the PCI bus until data corresponding to the request is present in the pre-fetch buffer that was allocated to the initial request. Such request retries are depicted as a "RETRY 1" loop and a "RETRY 2" loop in FIG. 4. Once data is present in the pre-fetch buffer, the PCI device is connected to the PCI bridge. In this context, the term "connected" means data may flow between the PCI device requesting the data and the PCI bridge; of course, the PCI device is always physically connected to its PCI bus, which in turn is physically connected to the PCI bridge.

Once a connection is established, the data in the pre-fetch buffer is transferred to the requesting PCI agent. This is depicted in FIG. 4 as a data transfer 400 from a pre-fetch buffer 320$_1$ time instance 402 to a channel 1 request virtual store 404. In practice, channel 1 request virtual store 404 and channel 2 request 408 (discussed below) do not physically exist, but are used herein for illustrative purposes. In practice, data will be received by dual-channel PCI SCSI device 302 and forwarded on an appropriate channel to be stored on the disk drive identified by the original request. These transfer operations are internal to the PCI SCSI device and/or SCSI disk drives and are outside the scope of the present invention.

Generally, a given data transfer from a pre-fetch buffer may continue until a disconnection event occurs, such as an empty buffer. Typically, the fill rate into a pre-fetch buffer and the transfer rate out of the same buffer will not be the same. It is most common for these transfers to be somewhat asynchronous, although they may be overlapping for a portion of the transfer. As a result, the pre-fetch buffer is typically emptied before a next portion of data is provided to the buffer from the primary side of the PCI bridge. As a policy, the connection is disconnected when the corresponding pre-fetch buffer becomes empty.

The presence of a multi-function PCI device creates a problem whenever a connection to that device is established. This results from the fact that there may be multiple (two in the present example) pre-fetch buffers allocated to the same physical PCI device. In order to ensure data integrity under the PCI specification's consumer-provider model, a virtual pre-fetch buffer 407 is employed. This virtual pre-fetch buffer 407 is depicted by the dashed outline box in FIGS. 4 and 5. In one embodiment, the virtual pre-fetch buffer 407 is controlled by software (i.e., firmware) running on the PCI bridge and/or programmed logic. The virtual pre-fetch buffer 407 is used to map various physical pre-fetch buffers to corresponding requests. As a result, the requesting PCI device can "see" only one pre-fetch buffer at a time, i.e., the physical pre-fetch buffer that currently corresponds to the virtual pre-fetch buffer 407. In the case of data transfer 400, dual-channel PCI SCSI device 302 is only aware of the existence of pre-fetch buffer 302$_1$ at the point in time the connection exists.

The PCI Bridge will provide data from pre-fetch buffer 320$_1$ until that pre-fetch buffer runs out of data or the requesting PCI device (dual-channel PCI SCSI device) disconnects the data transfer. Once that transaction is disconnected, the PCI Bridge may retry the read request resulting from channel 2 until the PCI bridge has data to start the transfer. Eventually, data will be present in the pre-fetch buffer allocated to the channel 2 request, as depicted by a pre-fetch buffer 320$_2$ time instance 406. If the presence of data in pre-fetch buffer 320$_2$ is detected, dual-channel PCI SCSI device 302 is reconnected, with pre-fetch buffer 320$_2$ becoming the virtual pre-fetch buffer 407. The data in pre-fetch buffer 320$_2$ are then transferred to a channel 2 request virtual store 408 until the buffer is emptied, as depicted by a data transfer 410.

From the perspective of the primary side of PCI bridge 200, the data request corresponding to channel 1's first read request has not been filled. Thus, while other PCI agents are being serviced on the secondary side, portions of data corresponding to data 310 continue to be provided to posting buffer 212P, which in turn continues to fill pre-fetch buffer 320$_1$, as depicted by a buffer instance 412. However, this data is eventually flushed (or invalidated) when the PCI Bridge start providing data to the read request generated by the dual-channel PCI SCSI device 320 to fulfill the request originated by channel 2. Similar buffer flushing operations for each of pre-fetch buffers 320$_1$ and 320$_2$ occur in response to each new read request, as shown in the remaining portion of FIG. 4.

Continuing in time with the diagram of FIG. 4, upon receiving data at channel 1 request virtual store 404, dual-channel PCI SCSI device 320 determines that its original request (which corresponded to the entirety of data 310), was not fulfilled. Thus, it must make another (subsequent) request for the remaining portion of data 310. This request corresponds to a second channel 1 read request (CH. 1. READ REQUEST 2).

As illustrated in the lower half of FIG. 4, the cycle of read request, buffer flush, data present, channel connect, virtual pre-fetch buffer assignment, data transfer until buffer is empty, and channel disconnect is repeated for each of channels 1 and 2. Each request results in another sliver of data added to the corresponding channel's virtual store, as depicted by data transfers 414 and 416 for channel 1, and data transfers 418 and 420 for channel 2. This process is repeated until the entire portion of the original data request is received.

The conventional scheme illustrated in FIG. 4 has several problems. As discussed above, data that are already pre-fetched to a pre-fetch buffer are flushed in response to each new read request. This creates inefficiencies for the primary side of the PCI bridge, as portions of the same data (i.e., the discarded data) must be retrieved more than once. However, a more significant problem relates to the small amount of data that is transferred with each request. It can be readily observed that there is quite a bit of overhead for each cycle. This corresponds to bus cycles that are effectively wasted. The result is that a significant portion of the cycles related to data transfer do not move any data, dramatically reducing the data transfer rate. In fact, laboratory observations have measured the data size transferred with each read request cycle to be as small as 8 or less data phases. This yields an aggregate multi-channel data transfer rate that is actually less than that observed for a single-channel device.

In accordance with aspects of the present invention, a Delayed Transaction (DT) mechanism is now disclosed that significantly improves the multi-channel data transfer rate produced by the conventional scheme of FIG. 4. The mechanism eliminates small data transfers by implementing a programmable pre-fetch buffer watermark (WM) that must be met before data may be transferred from the buffer. The DT mechanism can be used with any number of functions or channels in a multi-function device. Moreover, the DT mechanism may be used to support multiple multi-channel devices connected to the same PCI bus.

Figure 5:
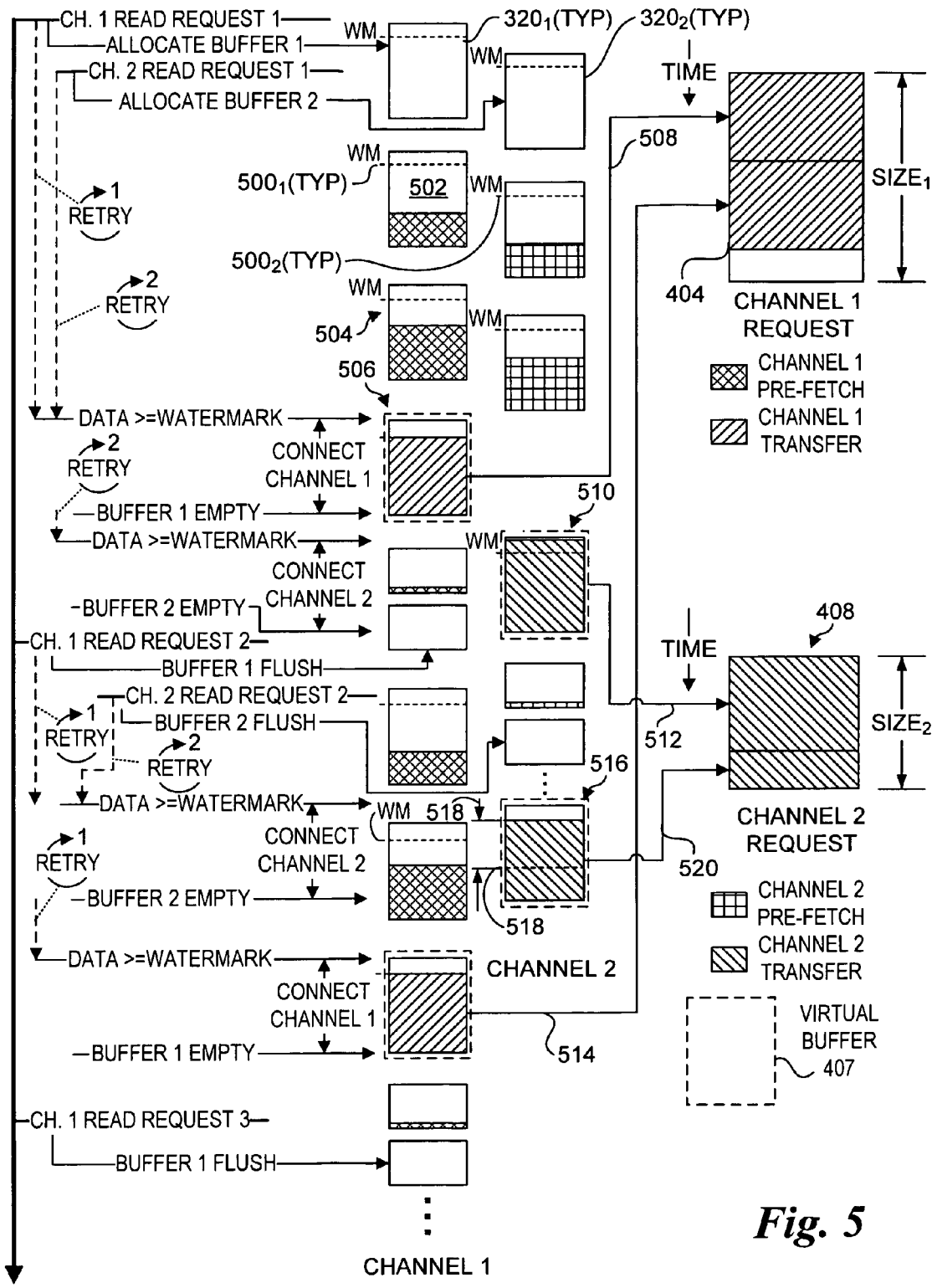
FIG. 5 is a schematic flow diagram illustrating operations to perform the data transfers of FIG. 3a using a pair of delayed transactions performed by a PCI bridge configured in accordance with one embodiment of the invention.

Operation of the mechanism in accordance with one embodiment is shown in FIG. 5. In general, like-labeled objects in each of FIGS. 4 and 5 perform analogous functions. As with FIG. 4, the timescales in FIG. 5 are not evenly spaced, and the operations of channels 1 and 2 are asynchronous.

The process starts in the same manner as that discussed for the conventional scheme of FIG. 4. In response to respective data transfer requests to dual-channel PCI SCSI device 302, first Channel 1 and Channel 2 read request are made and corresponding pre-fetch buffers are allocated. In conjunction with the allocation of the pre-fetch buffers, a configuration register (defined in further detail below) is programmed to define buffer watermarks $500_1$ and $500_2$. The watermark is used to define a minimum amount of data that must be present in a pre-fetch buffer before any data may be transferred from the buffer.

As before, retry attempts are placed on the PCI bus corresponding to the first read requests. In contrast to the conventional scheme, a retry request when any data is present will not produce a connection. Rather, a connection may only be established after the amount of data in the pre-fetch buffer has met or exceeded the watermark. For example, read requests corresponding to pre-fetch buffer $320_1$ time instances 502 and 504 will be retried, while a retry during time instance 506 will produce a connection. During the first connection for channel 1, an amount of data of the buffer watermark $500_1$ or greater is transferred to channel 1 request virtual store 404, as depicted by a data transfer 508. In many instances, the amount of data will be greater than the threshold because data may continue to flow into the buffer during the transfer. The data transfer continues until the buffer is emptied.

Although pre-fetch buffer $320_2$ may be filled to its watermark $500_2$ during the first channel 1 connection (not shown), data from pre-fetch buffer $320_2$ will not be transferred at this point. This also may produce a situation where the amount of data in a pre-fetch buffer exceeds the watermark $500_2$, as depicted by pre-fetch buffer $320_2$ time instance 510.

After a given connection is disconnected, the PCI Bridge can start servicing other read requested provided there is sufficient data in the corresponding pre-fetch buffer. Thus, if the pre-fetch buffer for a given channel exceeds its watermark while a connection for another channel is taking place, that channel will be connected on the first read request retry after the other channel is disconnected. This situation is depicted in FIG. 5 for the first data transfer 512 of channel two. In this instance, the amount of data transferred will at least be equal to the amount of data present in the buffer at the time the transfer is initiated (i.e., at the beginning of the connection) provided that the requesting device (dual-channel PCI SCSI controller 302) does not disconnect the data transfer due to some other reason.

Returning to channel 1 operations, shortly after data are transferred to channel 1 request virtual store 404 via data transaction 508, dual-channel PCI SCSI controller 302 determines that not all of the data corresponding to the first channel 1 read request were returned. It then issues a second channel 1 read request (i.e., a subsequent read request) that includes the portion of data 310 that has yet to be received. As with the first channel 1 read request, read requests are retried until the amount of data in pre-fetch buffer $320_1$ meets or exceeds the watermark $500_1$. At this point a second channel 1 connection occurs, and a second portion of data is transferred to channel 1 request virtual store 404, as depicted by a data transfer 514.

This cycle of read request, data meets or exceeds watermark, channel connect, virtual pre-fetch buffer assignment, data transfer until buffer is empty or requester disconnects, is repeated for a given channel in a similar manner until the original transaction is completed. During the last transfer, an "extra" portion of data may be received at the requesting PCI agent (e.g., PCI SCSI controller 302). This is an inherent result produced by the PCI transfer architecture itself. This extra portion of data is simply discarded by the PCI agent.

For example, in response to a second read request on channel 2 (CH. 2 READ REQUEST 2), the amount of data that remains to fulfill the original request is less than buffer watermark $500_2$. However, the amount of data transferred to pre-fetch buffer $320_2$ (as shown by time instance 516) will include the remaining size 518 plus an extra portion of data 519 needed to reach watermark $500_2$. An amount of data at least equal to the remaining size (and possibly including some or all of the extra portion, is transferred during the channel 2 connection. Generally, the requesting PCI agent will disconnect one it receives the remaining size. However, in situations where the PCI agent does not disconnect upon receiving the remaining size, any of the extra portion that is transferred to it is simply discarded.

Figure 6:
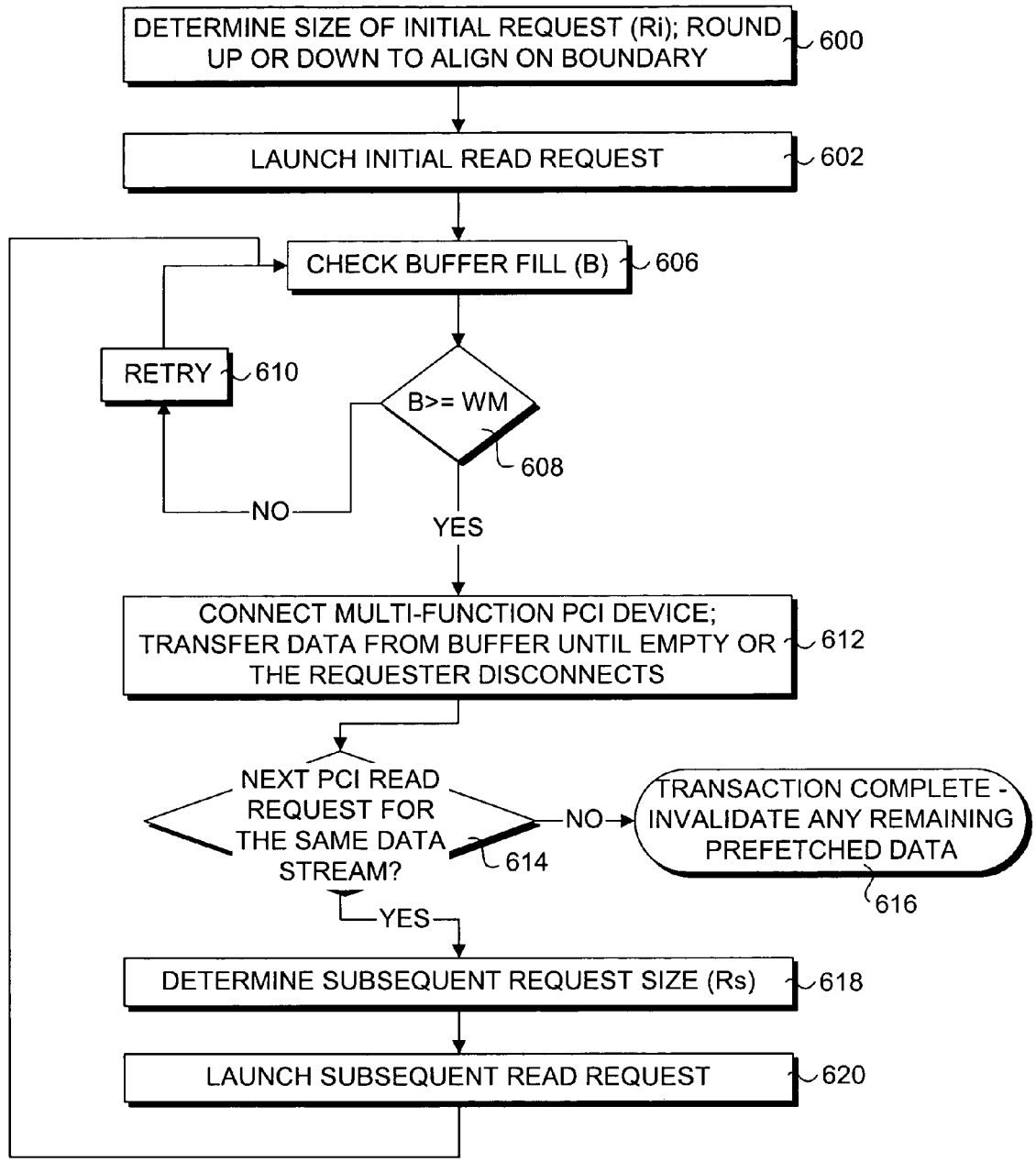
FIG. 6 is a flowchart illustrating further details of the operations performed during the data transfers of FIG. 3a, according to one embodiment of the invention.
Figure 7:
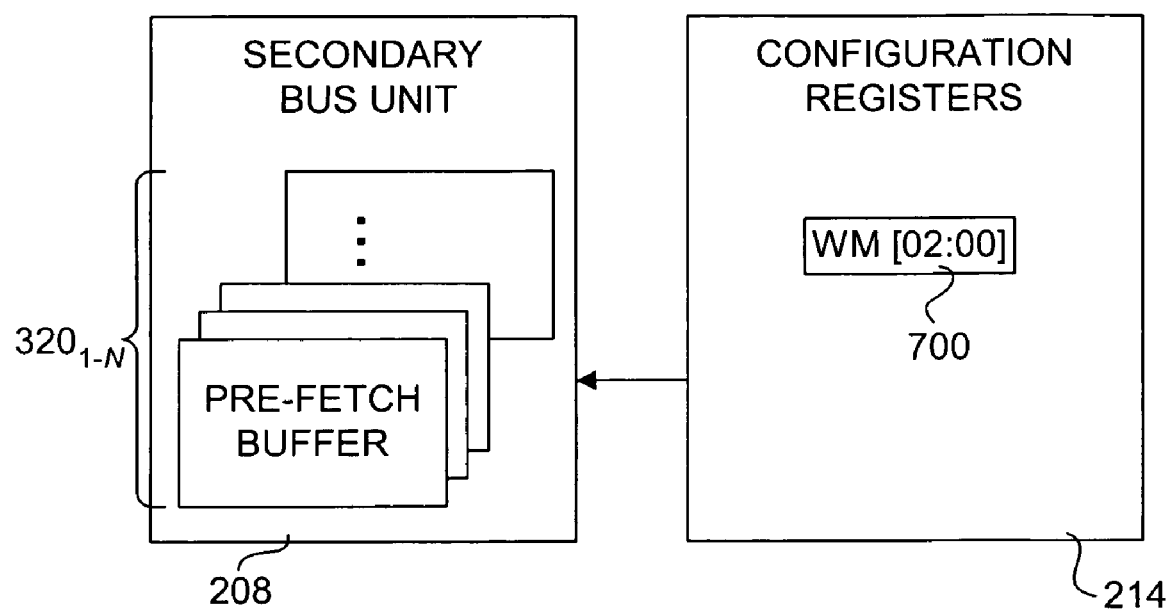
FIG. 7 is a schematic diagram illustrating an exemplary configuration register to store a buffer fill watermark, according to one embodiment of the invention.

FIG. 6 shows a flowchart illustrating further details of the operations and logic performed during the process of FIG. 5, according to one embodiment. In a block 600 a determination is made to the initial size of the memory request (Ri). In one embodiment this initial size is rounded up or down so that the actual amount that is fetched is naturally aligned with a pre-determined boundary. For example, the boundary may include but is not limited to 64 bytes, 128 bytes, 256 bytes, etc.

In one embodiment, it is desired to align on a 128-byte line. Under this embodiment, if the initial address is less than 64-bytes into the 128-byte line, the Ri value is rounded down (i.e. 8 64-byte lines will become 7 64-byte lines+ remainder). If the initial address is more than 64-bytes into the 128-byte line, the Ri value is rounded up (i.e. 8 64-byte lines will become 7 64-byte lines+remainder). For example, suppose the address starts at 32 bytes into a 128-byte line, and the fetch length is 4-64 byte lines (256 bytes). The amount fetched will be 256−32=224 bytes (56 dWords). In contrast, suppose the address starts at 96 bytes into a 128-byte line, and the fetch length is 4 64-byte lines (256 bytes). The amount fetched will be 256+(128−96)=288 bytes (72 dWords).

After the initial read request size is determined, the initial read request is launched in a block 602. At this point, a series of loops are performed until all of the data have been transferred to complete the data transaction. First, the amount of data in the buffer (B) is checked in a block 606. A determination is then made in a decision block 608 to whether the amount of data meets or exceeds the watermark WM. If it does not, the pre-fetch buffer is not full enough to cause a connection to initiate, and the read request is retried in a block 610. The operations of blocks 606, 608, and 610 are continued in a similar manner until the answer to decision block 608 is YES, indicating the amount of data in the pre-fetch buffer meets or exceeds the watermark WM.

In response to the YES determination, the logic proceeds to a block 612 in which the multi-function PCI device is connected and the data in the pre-fetch buffer is transferred out until the buffer is empty or the requester disconnects the transfer. Following the data transfer, a determination is made in a decision block 614 to whether additional data need to be transferred. If not, the PCI device next generates a PCI read request to corresponding to a different data stream, the transaction is complete, as indicated by an end block 616.

If more data need to be retrieved the logic proceeds to a block 618, wherein the size (Rs) of a subsequent (i.e., next) read request is determined. This determination is analogous to that made in block 600. A corresponding subsequent read request is then launched in a block 620.

At this point, a series of loops are performed until all of the data have been transferred to complete the data transaction. During each loop, the pre-fetch buffer is filled to meet or exceed the watermark WM, and the PCI agent is connected. Data is then transferred from the buffer to the requesting agent in block 612 in the manner described above. Eventually, the transaction is completed.

In one embodiment, various pre-fetch buffer parameters are stored in configuration registers 214. In one embodiment, a pre-assigned register 700 is used to store the watermark WM value. In general, the register may be programmed by the system BIOS. In another embodiment, a portion (i.e., field) of a shared register is used to store the watermark value (not shown). In one embodiment, the watermark value comprises a 3-bit register or field. In one embodiment, the watermark value is determined based on observation of data transfers for a particular multi-function PCI device in combination with a particular platform configuration.

Embodiments of the present invention show significant improvement in transfer rates when compared with the conventional scheme known in the prior art. For example, laboratory bandwidth measurements have demonstrated an improvement from 30 megabits per second (MB/sec) under the conventional scheme to 140–160 MB/sec for dual-channel PCI SCSI controller cards on which an embodiment of the invention was implemented.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for performing a delayed transaction, comprising:
   (a) receiving a read request from a PCI (Peripheral Component Interconnect) agent coupled to a PCI bridge to transfer data from system memory to the PCI agent, wherein the first read request references an initial starting address at which the data is located;
   allocating a pre-fetch buffer for the delayed transaction;
   (b) setting a buffer fill watermark to an initial value for the pre-fetch buffer;
   (c) receiving a current portion of the data at the PCI bridge;
   (d) transferring at least a portion of the current portion of the data into the pre-fetch buffer while monitoring a fill level of the pre-fetch buffer;
   (e) connecting the PCI agent to the PCI bridge in response to determining the fill level of the pre-fetch buffer meets or exceeds the buffer fill watermark;
   (f) enabling data to be transferred from the pre-fetch buffer to the PCI agent once the fill level of the pre-fetch buffer meets or exceeds the buffer fill watermark until the pre-fetch buffer is emptied or the PCI agent disconnects;
   (g) receiving one or more subsequent read requests from the PCI agent, each subsequent read request having a starting address corresponding to a remaining portion of the data that has yet to be received by the PCI agent; and
   (h) repeating operations (c)–(g) until the data transaction is completed.

2. The method of claim 1, further comprising programming a configuration register on the PCI bridge to set the buffer fill watermark.

3. The method of claim 1, further comprising determining a buffer fill watermark value by observing data transfer rates of the PCI agent when different watermarks are used.

4. The method of claim 3, further comprising dynamically setting the buffer fill watermark value.

5. The method of claim 1, wherein the PCI agent comprises a multi-channel PCI device, and a respective set of operations (a)–(h) is performed for each channel to perform a plurality of concurrent delayed transactions.

6. The method of claim 5, wherein the multi-channel PCI device comprises a dual-channel mass storage device controller.

7. A method comprising:
   receiving first and second data transfer requests from a multi-channel PCI (Peripheral Component Interconnect) device, the first data transfer request corresponding to a first channel, the second data transfer request corresponding to a second channel;
   initiating respective first and second delayed transactions corresponding to the first and second data transfer requests at a PCI bridge;

setting up a first pre-fetch buffer corresponding to the first delayed transaction, the first pre-fetch buffer having a first buffer fill watermark;

setting up a second pre-fetch buffer corresponding to the second delayed transaction, the second pre-fetch buffer having a second buffer fill watermark;

monitoring each of the first and second pre-fetch buffers to determine if the fill level of a buffer meets or exceeds its buffer fill watermark, that pre-fetch buffer being a first filled buffer;

and in response thereto, connecting the multi-channel PCI device to the PCI bridge;

mapping a virtual buffer to the first filled buffer;

transferring data from the first filled buffer to multi-channel PCI device until the first filled buffer is empty; and disconnecting the multi-channel PCI device from the PCI bridge.

8. The method of claim 7, further comprising:

determining that a pre-fetch buffer other than the first filled buffer has been filled to meet or exceed its buffer fill watermark, said pre-fetch buffer being a second filled buffer;

and in response thereto, connecting the multi-channel PCI device to the PCI bridge; and mapping the virtual buffer to the second filled buffer;

transferring data from the second filled buffer to the multi-channel PCI device until the second filled buffer is empty; and disconnecting the multi-channel PCI device from the PCI bridge.

9. The method of claim 7, wherein the multi-channel PCI device comprises a mass storage controller.

10. The method of claim 9, wherein the multi-channel PCI device comprises a dual-channel PCI SCSI (Small Computer System Interface) controller.

11. The method of claim 7, wherein each of the first and second data transfers comprises a transfer of data stored in memory to the multi-channel PCI device.

12. The method of claim 7, wherein the PCI bridge comprises a host-to-PCI bridge.

13. The method of claim 7, wherein the PCI bridge comprises a PCI-to-PCI bridge.

14. An apparatus, comprising:

an integrated circuit comprising circuitry to effectuate a PCI (Peripheral Component Interconnect) bridge, including:

a primary bus unit including a primary bus interface;

a secondary bus unit including a secondary bus interface; and programmed logic to perform operations including:

receiving first and second read requests from a multi-channel PCI device coupled to the secondary bus interface, the first read request corresponding to a first channel and having an initial size, the second read request corresponding to a second channel and having an initial size;

initiating respective first and second delayed transactions corresponding to the first and second read requests;

setting up a first pre-fetch buffer corresponding to the first delayed transaction, the first pre-fetch buffer having a first buffer fill watermark;

setting up a second pre-fetch buffer corresponding to the second delayed transaction, the second pre-fetch buffer having a second buffer fill watermark;

monitoring each of the first and second pre-fetch buffers to determine if the fill level of a buffer meets or exceeds its buffer fill watermark, that pre-fetch buffer being a first filled buffer; and in response thereto, connecting the multi-channel PCI device to the secondary bus unit; and mapping a virtual buffer to the first filled buffer;

transferring data from the first filled buffer to the multi-channel PCI device until the first filled buffer is empty; and disconnecting the multi-channel PCI device from the secondary bus unit.

15. The apparatus of claim 14, further comprising programmed logic to perform operations including:

determining that a pre-fetch buffer other than the first filled buffer has been filled to meet or exceed its buffer fill watermark, said pre-fetch buffer being a second filled buffer;

and in response thereto, connecting the multi-channel PCI device to the secondary bus unit;

mapping the virtual buffer to the second filled buffer;

transferring data from the second filled buffer to the multi-channel PCI device until the second filled buffer is empty; and disconnecting the multi-channel PCI device from the secondary bus unit.

16. The apparatus of claim 14, further comprising programmed logic to perform operations including:

receiving a subsequent read request corresponding to the first read request;

determining whether a size of the subsequent read request is less than the first buffer fill watermark; and in response thereto, setting the second buffer fill watermark equal to the size of the subsequent read request.

17. The apparatus of claim 16, further comprising:

a plurality of configuration registers, each including a field to define a size of a subsequent read request buffer fill watermark.

18. The apparatus of claim 14, wherein the primary bus interface comprises an interface to a host bus and the secondary bus interface comprises an interface to a PCI root bus.

19. The apparatus of claim 14, wherein each of the first and secondary bus interfaces comprises an interface to a PCI bus.

20. The apparatus of claim 14, further comprising a configuration register to store a buffer fill watermark value.

21. A computing platform, comprising:

a motherboard including a host bus and a PCI (Peripheral Component Interconnect) bus;

a processor operatively coupled to the host bus;

memory operatively coupled to the host bus; and a host-to-PCI bridge including a primary bus unit having an interface coupled to the host bus and a secondary bus unit having an interface coupled to the PCI bus, the host-to-PCI bridge further including programmed logic to perform operations including:

receiving first and second read requests from a multi-channel PCI device coupled to the PCI bus, the first read request corresponding to a first channel and having an initial size, the second read request corresponding to a second channel and having an initial size;

initiating respective first and second delayed transactions corresponding to the first and second read requests;

setting up a first pre-fetch buffer corresponding to the first delayed transaction, the first pre-fetch buffer having a first buffer fill watermark;

setting up a second pre-fetch buffer corresponding to the second delayed transaction, the second pre-fetch buffer having a second buffer fill watermark;

monitoring each of the first and second pre-fetch buffers to determine if the fill level of a buffer meets or exceeds its buffer fill watermark, that pre-fetch buffer being a first filled buffer;

and in response thereto, connecting the multi-channel PCI device to the secondary bus unit;

mapping a virtual buffer to the first filled buffer;

transferring data from the first filled buffer to the multi-channel PCI device until the first filled buffer is empty; and disconnecting the multi-channel PCI device from the secondary bus unit.

22. The computing platform of claim 21, wherein the host-to-PCI bridge further comprises programmed logic to perform operations including:

determining that a pre-fetch buffer other than the first filled buffer has been filled to meet or exceed its buffer fill watermark, said pre-fetch buffer being a second filled buffer;

and in response thereto, connecting the multi-channel PCI device to the secondary bus unit;

mapping the virtual buffer to the second filled buffer;

transferring data from the second filled buffer to the multi-channel PCI device until the second filled buffer is empty; and disconnecting the multi-channel PCI device from the secondary bus unit.

23. The computing platform of claim 21, wherein the host-to-PCI bridge further comprises a configuration register to store a buffer fill watermark value.

24. The computing platform of claim 21, further comprising an integrated multi-channel PCI device coupled to the PCI bus.

25. The computing platform of claim 24, wherein the integrated multi-channel PCI device comprises a dual channel SCSI (Small Computer System Interface) controller.

26. The computing platform of claim 21, wherein the host-to-PCI bridge is integrated on a platform chipset.

* * * * *